(12) United States Patent
Wu

(10) Patent No.: US 12,238,739 B2
(45) Date of Patent: Feb. 25, 2025

(54) DCI FORMAT RECEPTION METHOD AND CONFIGURED GRANT DOWNLINK CHANNEL RECEPTION METHOD

(71) Applicant: GUANGDONG OPPO MOBILE TELECOMMUNICATIONS CORP., LTD., Guangdong (CN)

(72) Inventor: Zuomin Wu, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 386 days.

(21) Appl. No.: 17/858,354

(22) Filed: Jul. 6, 2022

(65) Prior Publication Data

US 2022/0338238 A1    Oct. 20, 2022

Related U.S. Application Data

(63) Continuation of application No. PCT/CN2020/087397, filed on Apr. 28, 2020.

(30) Foreign Application Priority Data

Feb. 26, 2020 (CN) .......................... 202010121549.1

(51) Int. Cl.
*H04W 72/12* (2023.01)
*H04W 72/23* (2023.01)
*H04W 74/00* (2009.01)

(52) U.S. Cl.
CPC ......... *H04W 72/23* (2023.01); *H04W 74/006* (2013.01)

(58) Field of Classification Search
CPC .................................................. H04W 74/006
See application file for complete search history.

(56) References Cited

U.S. PATENT DOCUMENTS

2014/0105164 A1   4/2014   Moulsley
2019/0372727 A1   12/2019  Joseph
(Continued)

FOREIGN PATENT DOCUMENTS

CN   102811495 A   12/2012
CN   110324916 A   10/2019
(Continued)

OTHER PUBLICATIONS

Second Office Action of the European application No. 20921618.3, issued on Apr. 25, 2024. 6 pages.
(Continued)

*Primary Examiner* — Zhiren Qin
(74) *Attorney, Agent, or Firm* — PERKINS COIE LLP

(57) ABSTRACT

Disclosed are a DCI format receiving method, a pre-configured downlink channel receiving method, a DCI format configuration method, a pre-configured downlink channel sending method and apparatus, a terminal device, and a network device. The DCI format receiving method at least includes: a terminal device being configured to detect a DCI format 2_0, wherein the terminal device does not expect a no slot format indicator field to be configured in the DCI format 2_0; or, if the terminal device determines that no slot format indicator field is configured in the DCI format 2_0, the terminal device not detecting the DCI format 2_0; or, if the terminal device determines that a slot format indicator field is configured in the DCI format 2_0, the terminal device detecting the DCI format 2_0.

3 Claims, 10 Drawing Sheets

---

A network device configures configured grant downlink resources for a terminal device, the configured grant downlink resources occupy resources in at least one RB set, and the configured grant downlink resources are used to transmit a configured grant downlink channel — 301

The network device determines whether to transmit the configured grant downlink channel on the configured grant downlink resources — 302

(56) References Cited

U.S. PATENT DOCUMENTS

| | | | | |
|---|---|---|---|---|
| 2020/0028659 | A1* | 1/2020 | Huang | H04L 5/0092 |
| 2020/0045680 | A1 | 2/2020 | Ren | |
| 2020/0045696 | A1* | 2/2020 | Huang | H04W 72/0446 |
| 2020/0053728 | A1* | 2/2020 | Huang | H04L 27/26025 |
| 2020/0260442 | A1 | 8/2020 | Yi | |
| 2021/0258994 | A1* | 8/2021 | Bae | H04W 52/0225 |
| 2024/0008075 | A1* | 1/2024 | Kwak | H04W 72/0453 |

FOREIGN PATENT DOCUMENTS

| | | |
|---|---|---|
| CN | 110401973 A | 11/2019 |
| CN | 110708152 A | 1/2020 |
| CN | 110784926 A | 2/2020 |
| CN | 111491341 A | 8/2020 |
| CN | 113225789 A | 8/2021 |
| WO | 2011099607 A1 | 8/2011 |
| WO | 2017032408 A1 | 3/2017 |
| WO | 2019083317 A1 | 5/2019 |
| WO | 2019191987 A1 | 10/2019 |

OTHER PUBLICATIONS

LG Electronics:"Summary#2 on maintenance of wide-band operation for NR-U" 3GPP Draft; R1-2001163 3rd Generation Partnership Project (3GPP), Mobile Competence Centre ; 650, Route Des Lucioles ; F-06921 Sophia-Antipolis Cedex ; France,vol. RAN WG1, No. e-Meeting; Feb. 24, 2020-Mar. 6, 2020 Feb. 22, 2020 (Feb. 22, 2020), XP051853709.

Sharp:"Remaining issues and corrections on DL signals and channels for NR-U", 3GPP Draft; R1-2000871, 3rd Generation Partnership-project (3GPP), Mobile Competence Centre ; 650, Route Des Lucioles ; F-06921 Sophia-Antipolis Cedex ; FRANCE,vol. RAN WG1, No. e-Meeting; Feb. 24, 2020-Mar. 6, 2020 Feb. 22, 2020 Feb. 15, 2020(Feb. 15, 2020), XP051853486.

Partial Supplementary European Search Report in the European application No. No. 20921618.3, mailed on Jan. 5, 2023.

Interdigital et al: "DL signals and channels for gNB initiated COT",3GPP Draft; R1-1902585 DL Signals and Channels for GNB Initiated COT, 3rd Generation Partnership Project (3GPP), Mobile Competence Centre ; 650, Route Des Lucioles ;F-06921 Sophia-Antipolis Cedex ;vol. RAN WG1, No. Athens, Greece; Feb. 25, 2020-Mar. 6, 2020 Feb. 16, 2019 (Feb. 16, 2019), XP051600278.

OPPO: "Discussion on the remaining issues of DL signals and channels",3GPP Draft; R1-2000468, 3rd Generation Partnership Project (3GPP), Mobile Competence Centre ; 650, Route Des Lucioles ; F-06921 Sophia-Antipolis Cedex ; France,vol. RAN WG1, No. Athens, Greece; Feb. 24, 2020-Feb. 28, 2020 Feb. 15, 2020 (Feb. 15, 2020), XP051853319.

Anonymous: "3rd Generation Partnership Project; Technical Specification Group Radio Access Network; NR; Physical layer proceduresfor control (Release 16)",3GPP Standard; Technical Specification; 3GPP TS 38.213, 3rdgeneration Partnership Project (3GPP), Mobile Competence Centre ; 650, Route Des Lucioles ; F-06921 Sophia-Antipolis Cedex ; France,vol. RAN WG1, No. V16.0.0 Jan. 14, 2020 (Jan. 14, 2020), pp. 1-146,XP051860806.

Huawei et al: "Corrections on the wideband operation procedures",3GPP Draft; R1-2000201, 3rd Generation Partnership Project (3GPP), Mobile Competence Centre ; 650, Route Deslucioles ; F-06921 Sophia-Antipolis Cedex ; France,vol. RAN WG1, No. Feb. 24, 2020-Mar. 6, 2020 Feb. 22, 2020 Feb. 15, 2020 (Feb. 15, 2020), XP051853197.

Supplementary European Search Report in the European application No. 20921618.3, mailed on Mar. 3, 2023.

Qualcomm Incorporated, "TP for wideband operation for NR-U"3GPP TSG RAN WG1 Meeting #100e, R1-2000960, Feb. 24-Mar. 6, 2020.

ETRI, "Remaining issues on DL signals and channels for NR-U", 3GPP TSG RAN WG1 #99, R1-1912637, Nov. 18-22, 2019.

ASUSTeK, "Discussion on DL signals and channels "3GPP TSG RAN WG1 #99 R1-1913057, Nov. 18-22, 2019.

LG Electronics, "Remaining issues of DL signals and channels for NR-U", 3GPP TSG RAN WG1 #100, R1-2000661, Feb. 24-Mar. 6, 2020.

NEC, "Symbol Level Transmission in LAA" 3GPP TSG RAN WG1 Ad-hoc Meeting, R1-151118, Mar. 24-26, 2015.

ZTE, "Maintenance on the DL channels for NR-U" 3GPP TSG RAN WG1 #100 R1-2000394, Feb. 24-Mar. 6, 2020.

Samsung, "Wideband operation for NR-U", 3GPP TSG RAN WG1 #100-e R1-2000614, Feb. 24-Mar. 6, 2020.

Ericsson, "On RSSI and channel occupancy in NR-U", 3GPP TSG-RAN WG4 Meeting #92-Bis R4-1912083, Oct. 14-18, 2019.

Second Office Action of the Chinese application No. 202210887619.3, issued on Oct. 7, 2023. 14 pages with English translation.

3GPP TSG RAN WG1 #98bis R1-1911158, Chongqing, China, Oct. 14-20, 2019, Source: NTT Docomo, Inc., Title: DL signals and channels for NR-U, Agenda Item: 7.2.2.1.2, Document for: Discussion and Decision. the whole document. 11 pages.

First Office Action of the European application No. 20921618.3, issued on Nov. 22, 2023. 3 pages.

First Office Action of the Chinese application No. 202210887619.3, issued on Aug. 16, 2023. 9 pages with English translation.

Qualcomm Incorporated, "TP for DL signals and channels for NR-U" 3GPP TSG RAN WG1 Meeting #100e R1-2000954; Feb. 15, 2020(Feb. 15, 2020) Section 2-5.

Samsung, "CR to TS 38.213 capturing the RAN1#92bis meeting agreements" 3GPP TSG-RAN1 Meeting #92bis R1-1805795; Apr. 20, 2018(Apr. 20, 2018).

International Search Report in the international application No. PCT/CN2020/087397, mailed on Nov. 27, 2020.

English translation of the Written Opinion of the International Search Authority in the international application No. PCT/CN2020/087397, mailed on Nov. 27, 2020.

* cited by examiner

DCI FORMAT RECEPTION METHOD AND CONFIGURED GRANT DOWNLINK CHANNEL RECEPTION METHOD

CROSS-REFERENCE TO RELATED APPLICATION

The present application is a continuation of International Application No. PCT/CN2020/087397 filed on Apr. 28, 2020, which claims priority to Chinese patent Application No. 202010121549.1 filed on Feb. 26, 2020, the disclosures of which are hereby incorporated by reference in their entireties.

TECHNICAL FIELD

Embodiments of the present disclosure relate to the field of mobile communication technologies, and in particular to a method for receiving a Downlink Control Information (DCI) format, a method for receiving a configured grant downlink channel, a method for configuring a DCI format, and a method for transmitting a configured grant downlink channel.

BACKGROUND

Information fields included in a DCI format 2_0 include, such as a Slot Format Indicator (SFI)-index field, an available Resource Block (RB) set indicator field, a channel occupancy duration indicator field, and a search space set group switching indicator field, all or a part of which are optionally configured in the DCI format 2_0. However, there is no conclusion on to how to specify a data transmission behavior of a terminal device in a case that a part of the indicator fields in the DCI format 2_0 are not configured.

SUMMARY

The embodiments of the present disclosure provide a method for receiving a DCI format, a method for receiving a configured grant downlink channel, a method for configuring a DCI format, and a method for transmitting a configured grant downlink channel, a terminal device, and a network device.

A method for receiving the DCI format provided in an embodiment of the present disclosure includes the following operations.

In response to that a terminal device is configured to detect a DCI format 2_0 and the terminal device expects that the DCI format 2_0 is configured with at least one of a slot format indicator field or a channel occupancy duration indicator field, the terminal device expects that the DCI format 2_0 is configured with an available Resource Block (RB) set indicator field; or in response to that a terminal device is configured to detect a DCI format 2_0 and the DCI format 2_0 is not configured with a slot format indicator field and a channel occupancy duration indicator field, the terminal device detects the DCI format 2_0.

A method for receiving a configured grant downlink channel provided in an embodiment of the present disclosure includes the following operations.

A terminal device is configured with configured grant downlink resources, the configured grant downlink resources occupy resources in at least one RB set, and the configured grant downlink resources are used to transmit the configured grant downlink channel.

The terminal device determines whether to receive the configured grant downlink channel on the configured grant downlink resources.

A method for configuring a DCI format provided in an embodiment of the present disclosure includes the following operations.

The network device configures a terminal device to detect a DCI format 2_0.

The network device configures at least one of a slot format indicator field or a channel occupancy duration indicator field in the DCI format 2_0 for the terminal device; and an available Resource Block (RB) set indicator field, or the network device configures a terminal device to detect a DCI format 2_0; and the network device configures no slot format indicator field and no channel occupancy duration indicator field in the DCI format 2_0 for the terminal device.

A method for transmitting a configured grant downlink channel provided in an embodiment of the present disclosure includes the following operations.

The network device configures configured grant downlink resources for a terminal device, where the configured grant downlink resources occupy resources in at least one RB set, and the configured grant downlink resources are used to transmit a configured grant downlink channel.

The network device determines whether to transmit the configured grant downlink channel on the configured grant downlink resources.

A terminal device provided in an embodiment of the present disclosure includes a processor and a memory. The memory is configured to store a computer program, and the processor is configured to invoke and execute the computer program stored in the memory to perform the above-described method for receiving the DCI format or the above-described method for receiving the configured grant downlink channel.

An network device provided in an embodiment of the present disclosure includes a processor and a memory. The memory is configured to store a computer program, and the processor is configured to invoke and execute the computer program stored in the memory to perform the above-described method for configuring the DCI format or the above-described method for transmitting the configured grant downlink channel.

BRIEF DESCRIPTION OF THE DRAWINGS

The drawings described herein are intended to provide a further understanding of the present disclosure and form a part of the present disclosure. The illustrative embodiments of the present disclosure and the description thereof are intended to explain the present disclosure and do not constitute pairwise an improper limitation of the present disclosure. In the drawings.

DETAILED DESCRIPTION

The technical solutions in the embodiments of the disclosure will be described below in combination with the drawings in the embodiments of the disclosure. It is apparent that the described embodiments are not all embodiments but part of embodiments of the disclosure. All other embodiments obtained by those of ordinary skill in the art based on the embodiments in the disclosure without creative work shall fall within the scope of protection of the disclosure.

The technical solutions of the embodiments of the present disclosure may be applied to various communication systems, such as a Global System of Mobile communication (GSM) system, a Code Division Multiple Access (CDMA) system, a Wideband Code Division Multiple Access (WCDMA) system, a General Packet Radio Service (GPRS) system, a Long Term Evolution (LTE) system, an LTE Frequency Division Duplex (FDD) system, an LTE Time Division Duplex (TDD) system, an Advanced Long Term Evolution (LTE-A) system, a New Radio (NR) system, an evolved system of the NR system, an LTE-based access to Unlicensed spectrum (LTE-U) system, an NR-based access to Unlicensed spectrum (NR-U) system, a Universal Mobile Telecommunication System (UMTS), a Worldwide Interoperability for Microwave Access (WiMAX) communication system, a Wireless Local Area Network (WLAN), a Wireless Fidelity (WiFi), a next generation communication system, or other communication system.

In general, the number of connections supported by conventional communication systems is limited and easy to implement. However, with the development of communication technologies, mobile communication systems will support not only conventional communication, but also, for example, Device-to-Device (D2D) communication, Machine-to-Machine (M2M) communication, Machine Type Communication (MTC), and Vehicle to Vehicle (V2V) communication, and the like. The embodiments of the present disclosure can also be applied to these communication systems.

The system architecture and service scenarios described in the embodiments of the present disclosure are intended to describe the technical solutions of the embodiments of the present disclosure more clearly, and do not constitute a limitation to the technical solutions provided by the embodiments of the present disclosure. A person of ordinary skill in the art will appreciate that the technical solutions provided in the embodiments of the present disclosure are also applicable to similar technical problems with the evolution of the network architecture and the emergence of new service scenarios.

Figure 1:
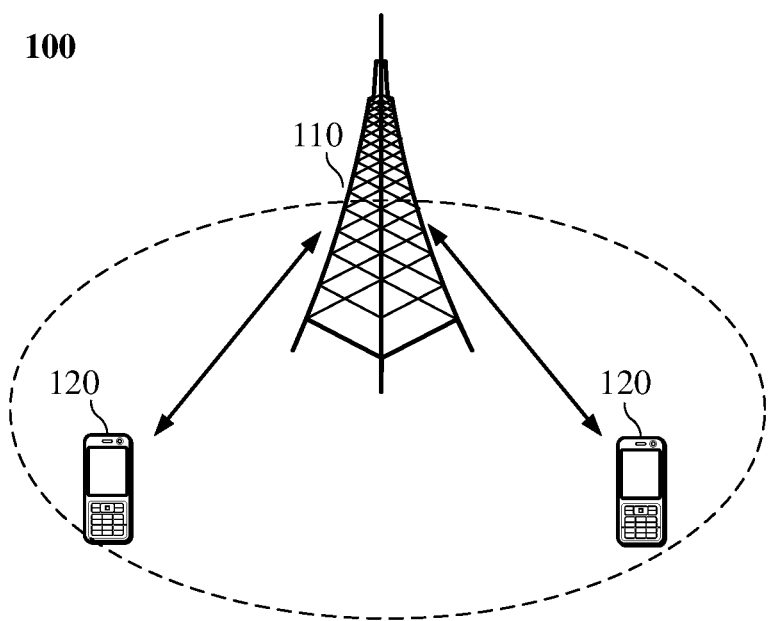
FIG. 1 is a schematic diagram of architecture of a communication system according to an embodiment of the present disclosure.

Exemplarily, a communication system 100 to which the embodiment of the present disclosure is applied is illustrated in FIG. 1. The communication system 100 may include a network device 110, which may be a device that communicates with a terminal 120 (or referred to as a communication terminal, a terminal). The network device 110 may provide communication coverage for a particular geographic area and may communicate with terminals located within the coverage area. Alternatively, the network device 110 may be an Evolutional Node B (eNB or eNodeB) in an LTE system, or may be a radio controller in a Cloud Radio Access Network (CRAN), or may be a mobile switching center, a relay station, an access point, a vehicle-mounted device, a wearable device, a hub, a switch, a bridge, a router, a network-side device in a 5G network, a network device in a future communication system, or the like.

The communication system 100 also includes at least one terminal 120 located within coverage of the network device 110. As used herein, the "terminal" includes, but is not limited to be connected: via a wired line, such as via a Public Switched Telephone Networks (PSTN), a Digital Subscriber Line (DSL), a digital cable, a direct cable connection; and/or another data connection/network; and/or via a wireless interface, for example, for a cellular network, a Wireless Local Area Network (WLAN), a digital television network such as a DVB-H network, a satellite network, a AM-FM broadcast transmitter; and/or means of another terminal arranged to receive/transmit communication signals; and/or an Internet of Things (IoT) device. The terminal configured to communicate through a wireless interface may be referred to as a "radio communication terminal", a "radio terminal" or a "mobile terminal". Examples of the mobile terminal include, but are not limited to: a satellite or cellular telephone; a Personal Communications System (PCS) terminal that may combine a cellular radio telephone with data processing, facsimile, and data communication capabilities; a Personal Digital Assistant (PDA) that may include a radio telephone, a pager, Internet/Intranet access, a Web browser, a notebook, a calendar, and/or a Global Positioning System (GPS) receiver; and conventional laptop and/or palmtop receivers or other electronic devices including radio telephone transceivers. The terminal may refer to an access terminal, User Equipment (UE), a user unit, a user station, a mobile station, a mobile radio station, a remote station, a remote terminal, a mobile device, a user terminal, a terminal, a radio communication device, a user agent, or a user device. The access terminal may be a cellular telephone, a cordless telephone, a Session Initiation Protocol (SIP) telephone, a Wireless Local Loop (WLL) station, a PDA, a handheld device having a radio communication function, a computing device or other processing device connected to a radio modem, an in-vehicle device, a wearable device, a terminal in a 5G network, a terminal in the future evolved PLMN, or the like.

Alternatively, Device to Device (D2D) communication may be performed between the terminals 120.

Alternatively, a 5G communication system or 5G network may also be referred to as a New Radio (NR) system or an NR network.

FIG. 1 exemplarily illustrates a network device and two terminals. Alternatively, the communication system 100 may include a plurality of network devices and other numbers of terminals may be included within a coverage area of each network device, which are not limited in the embodiments of the present disclosure.

Alternatively, the communication system 100 may further include other network entities such as a network controller, a mobility management entity, which are not limited by the embodiments of the present disclosure.

It should be understood that a device having a communication function in a network/system in the embodiments of the present disclosure may be referred to as a communication device. As an example of the communication system 100 illustrated in FIG. 1, the communication device may include a network device 110 and a terminal 120 having a communication function. The network device 110 and the terminal 120 may be specific devices described above, and details are not described herein. The communication device may also include other devices in the communication system 100, such as network controllers, mobility management entities, and other network entities, which are not limited in the embodiments of the present disclosure.

It should be understood that the terms "system" and "network" are used interchangeably herein. The term "and/or" in the disclosure means only an association relationship describing associated objects and represents that three relationships may exist. For example, A and/or B may represent three conditions: i.e., independent existence of A, existence of both A and B and independent existence of B. In addition, character "/" in the disclosure usually represents that previous and next associated objects form an "or" relationship.

In order to facilitate understanding of the technical solutions of the embodiments of the present disclosure, the related technologies of the embodiments of the present disclosure are described below. The following related technologies may be optionally combined with the technical solutions of the embodiments of the present disclosure, which all belong to the protection scope of the embodiments of the present disclosure.

An unlicensed spectrum is a spectrum allocated by counties and regions that can be used for radio device communication, and the spectrum is generally considered as a shared spectrum. That is, communication devices in different communication systems can use the spectrum as long as they meet the regulatory requirements set on the spectrum by the countries or regions, and do not need to apply for a proprietary spectrum license from a government.

In order to allow various communication systems that use the unlicensed spectrum for wireless communication to coexist amicably on the spectrum, some countries or regions prescribe regulatory requirements that must be met for the use of the unlicensed spectrum. For example, the communication device follows the principle of Listen Before Talk (LBT). That is, the communication device needs to perform channel listening before transmitting signals on a channel of the unlicensed spectrum, and the communication device can transmit a signal only when the channel listening result is that the channel is idle. If the channel listening result of the communication device on the channel of the unlicensed spectrum is that the channel is busy, the communication device cannot perform signal transmission. In order to ensure fairness, in one transmission, the duration during which the communication device transmits signals using the unlicensed spectrum channel cannot exceed a Maximum Channel Occupancy Time (MCOT).

The DCI format 2_0 in the R15 NR system and the DCI format 2_0 in the R16 NR-U system are described below.

DCI Format 2_0 in R15 NR System

Slot Format Indicator (SFI) information in the NR system is transmitted through the common PDCCH (GC-PDCCH), and the corresponding Downlink Control Information (DCI) format is the DCI format 2_0. The terminal device may be configured to detect the DCI format 2_0, or may not be configured to detect the DCI format 2_0. One DCI format 2_0 may include SFI information of one cell or a group of cells. A Cyclic Redundancy Check (CRC) corresponding to the DCI format 2_0 is scrambled by an SFI-RNTI. Here, the SFI-RNTI may be configured by a higher layer.

The DCI information transmitted in the DCI format 2_0 is as follows: SFI 1, SFI 2, . . . , SFI N. The maximum size of one SFI-index field may be, for example, nine bits to indicate one slot format combination identifier (ID). The size of the DCI format 2_0 is configured by the higher layer with a maximum number of bits of 128 bits. For each cell, the terminal device may be provided/configured with the following information: a cell identifier, a location of an SFI-index field in the DCI format 2_0, a slot format combination set (where each slot format combination in the set includes slot format combination identifiers and one or more slot format indicators, each slot format combination identifier corresponds to a respective one of the one or more slot format indicators), a reference subcarrier spacing (providing a first reference subcarrier spacing configuration and a second reference subcarrier spacing configuration corresponding to a normal uplink carrier and a supplementary uplink carrier in an unpaired spectrum operating mode; providing a first reference subcarrier spacing configuration and a second reference subcarrier spacing configuration corresponding to a downlink BWP and an uplink BWP in a paired spectrum operating mode).

After detecting the DCI format 2_0 according to the SFI-RNTI, if the terminal device wants to determine a slot format corresponding to a certain cell, the terminal device may find the cell identifier of the cell and determine the start location of the SFI-index field corresponding to the cell in the detected DCI format 2_0 according to the parameter configured by the higher layer, then read an SFI-index field starting from the start location, and determine the corresponding slot format from the slot format combination set configured by the higher layer according to the slot format combination identifier indicated by the SFI-index field.

Generally, a duration of the slot format indicator determined by the terminal device in the above manner is greater than or equal to a detection period for a Physical Downlink Control Channel (PDCCH) carrying the DCI format 2_0. That is, the terminal device may receive two SFIs at two different times, and the durations indicated by the two SFIs may partially overlap, where the slot formats indicated by the two SFIs are the same in the overlapping durations.

DCI Format 2_0 in R16 NR-U System

For each of a set of serving cells, the terminal device may be provided with at least one of the following information:

A cell identifier of the serving cell;

The location of the SFI-index field in the DCI format 2_0.

A slot format combination set, where each slot format combination in the slot format combination set includes: one or more slot format indicators, and a mapping relationship between a slot format combination identifier and the one or more slot format indicators, where the SFI-index field in the DCI format 2_0 indicates a slot format combination identifier;

A first reference subcarrier spacing configuration for the unpaired spectrum operating mode, optionally, if the supplementary uplink carrier is configured, a second reference subcarrier spacing configuration corresponding to the supplementary uplink carrier is also provided;

For the paired spectrum operating mode, a first reference subcarrier spacing configuration corresponding to a downlink BWP and a second reference subcarrier spacing configuration corresponding to a uplink BWP are provided;

A location of an available RB set indicator field in the DCI format 2_0, each bit in the available RB set indicator field has a one-to-one mapping relationship with each of the RB sets of the cell, where if the bit is in a first state (e.g., the indication is "0"), it indicates that the corresponding RB set is available for downlink reception, and if the bit is in a second state (e.g., the indication is "1"), it indicates that the corresponding RB set is unavailable for downlink reception. The available RB set indicator field is valid within the indicated channel occupancy duration. That is to say, the RB set may be available or unavailable for downlink reception before the end of the indicated channel occupancy duration.

The location of the channel occupancy duration indicator field in the DCI format 2_0, the channel occupancy duration indicator field indicates a remaining channel occupancy duration of the cell starting from a time domain location (such as a slot) at which the DCI format 2_0 has been detected by the terminal device. If the terminal device is not configured with a channel occupancy duration indicator field, the remaining channel occupancy duration of the cell includes the number of slots determined according to the slot format indicated by the SFI-index field starting from the time domain location (such as a slot) at which the DCI format 2_0 has been detected by the terminal device. Here, the channel occupancy duration indicator field may also be referred to as a channel occupancy time duration (COT duration) indicator field.

The location of the search space set group switching indicator field in the DCI format 2_0, the search space set group switching indicator field indicates one of the two search space set groups configured in the cell, to enable the terminal device to perform PDCCH detection in the cell according to the indicated search space set group.

In the NR-U system, for a serving cell, among the information fields included in the DCI format 2_0, the available RB set indicator field, the channel occupancy duration indicator field, and the search space set group switching indicator field are all configurable. However, there is no conclusion as to how to specify the data transmission behavior of the terminal device in the case that a part of the indicator fields in the DCI format 2_0 are not configured. To this end, the following technical solutions of the embodiments of the present disclosure are proposed.

Embodiments of the present disclosure propose the following methods for receiving the DCI format, which are described in detail below.

In an optional embodiment of the present disclosure, the terminal device is configured to detect the DCI format 2_0. The behavior of the terminal device may be one of the following:

The terminal device does not expect that the DCI format 2_0 is not configured with a slot format indicator field; Or, In response to that the terminal device determines that the DCI format 2_0 is not configured with the slot format indicator field, the terminal device does not detect the DCI format 2_0; Or In response to that the terminal device determines that the DCI format 2_0 is configured with the slot format indicator field, the terminal device detects the DCI format 2_0.

In an optional embodiment of the present disclosure, the terminal device is configured to detect the DCI format 2_0. The behavior of the terminal device may be one of the following:

The terminal device does not expect that the DCI format 2_0 is not configured with a slot format indicator field and a channel occupancy duration indicator field. Or In response to that the terminal device determines that the DCI format 2_0 is not configured with the slot format indicator field and the channel occupancy duration indicator field, the terminal device does not detect the DCI format 2_0. Or In response to that the terminal device determines that the DCI format 2_0 is configured with at least one of the slot format indicator field or the channel occupancy duration indicator field, the terminal device detects the DCI format 2_0.

It should be noted that, in all embodiments of the present disclosure, the "channel occupancy duration indicator field" may also be referred to as "channel occupancy time duration indicator field".

In an optional embodiment of the present disclosure, a terminal device is configured to detect a DCI format 2_0 and the DCI format 2_0 is not configured with a slot format indicator field and a channel occupancy duration indicator field. The behavior of the terminal device may be that the terminal device detects the DCI format 2_0.

Further, optionally, after detecting the DCI format 2_0, determining, the terminal device determines a channel occupancy duration according to at least one of the following manners:

The terminal device determines that the channel occupancy duration cannot be obtained.

The channel occupancy duration is 0.

The channel occupancy duration is a preset value.

The channel occupancy duration is configured by a network device.

It should be noted that in all embodiments of the present disclosure, the channel occupancy duration includes a channel occupancy time duration or a remaining channel occupancy duration.

Optionally, in all embodiments of the present disclosure, the channel occupancy duration may refer to a remaining channel occupancy duration of the cell starting from the time domain location at which the DCI format 2_0 is detected by the terminal device.

The embodiments of the present disclosure also propose the following methods for configuring the DCI format, which will be described in detail below.

In an optional embodiment of the present disclosure, a network device configures a terminal device to detect a DCI format 2_0. The network device configures a slot format indicator field in the DCI format 2_0 for the terminal device.

In an optional embodiment of the present disclosure, a network device configures a terminal device to detect a DCI format 2_0. The network device configures at least one of a slot format indicator field or a channel occupancy duration indicator field in the DCI format 2_0 for the terminal device.

In an optional embodiment of the present disclosure, a network device configures a terminal device to detect a DCI format 2_0. The network device configures no slot format indicator field and no channel occupancy duration indicator field in the DCI format 2_0 for the terminal device.

Further, optionally, the network device configures a first parameter for the terminal device, where the first parameter is used for the terminal device to determine a channel occupancy duration after detecting the DCI format 2_0.

The embodiment of the present disclosure further provides a method for receiving a configured grant downlink channel. It should be noted that the "configured grant downlink channel" in the embodiment of the present disclosure may also include "configured grant downlink transmission". It will be specifically described below.

Figure 2:
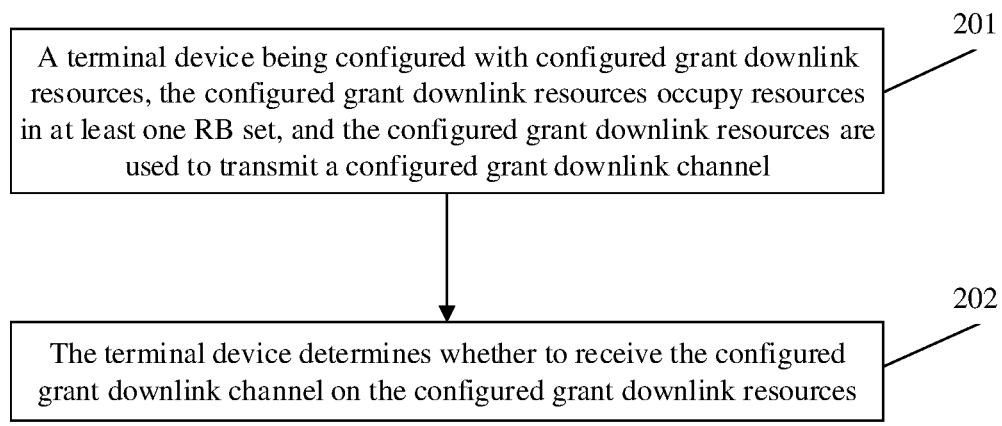
FIG. 2 is a flowchart of a method for receiving a configured grant downlink channel according to an embodiment of the present disclosure.

FIG. 2 is a flowchart of a method for receiving a configured grant downlink channel according to an embodiment of the present disclosure. As shown in FIG. 2, the method for receiving the configured grant downlink channel includes at least part of the following contents.

At 201: a terminal device is configured with configured grant downlink resources, where the configured grant downlink resources occupy resources in at least one RB set, and the configured grant downlink resources are used to transmit a configured grant downlink channel.

At 202: the terminal device determines whether to receive the configured grant downlink channel on the configured grant downlink resources.

The following describes in detail that the terminal device determines whether to receive the configured grant downlink channel on the configured grant downlink resources in combination with different situations.

Situation A: the terminal device is configured to detect a DCI format 2_0, the configured grant downlink resources occupy resources in at least two RB sets.

In this case, in response to that the terminal device determines, according to the detected DCI format 2_0, that the configured grant downlink resources in the at least two RB sets are available for a downlink reception, the terminal device receives the configured grant downlink channel on the configured grant downlink resources. Or, in response to that the terminal device determines, according to the detected DCI format 2_0, that the configured grant downlink resources in at least one of the at least two RB sets are unavailable for the downlink reception, or no DCI format 2_0 is detected by the terminal device, the terminal device does not receive the configured grant downlink channel on the configured grant downlink resources.

Optionally, the terminal device determines whether the configured grant downlink resources in the at least two RB sets are available for downlink reception according to indication information in an available RB set indicator field included in the DCI format 2_0.

Optionally, the terminal device determines whether the configured grant downlink resources in the at least two RB sets are available for downlink reception according to a channel occupancy duration indicator and/or an SFI-index included in the DCI format 2_0.

Situation B: the terminal device is not configured to detect a DCI format 2_0, the configured grant downlink resources occupy resources in at least two RB sets.

In this case, the terminal device determines not to receive the configured grant downlink channel on the configured grant downlink resources.

In another implementation, the terminal device does not expect to be configured with the configured grant downlink resources occupying the resources in at least two RB sets, and is not configured to detect the DCI format 2_0.

Situation C: the terminal device is configured to detect a DCI format 2_0, the configured grant downlink resources occupy resources in one RB set.

In this case, in response to that the terminal device determines, according to the detected DCI format 2_0, that configured grant downlink resources in the RB set are within a channel occupancy duration, the terminal device receives the configured grant downlink channel on the configured grant downlink resources; Or, in response to that the terminal device determines, according to the detected DCI format 2_0, that configured grant downlink resources in the RB set are not within a channel occupancy duration, or no DCI format 2_0 is detected by the terminal device, the terminal device does not receive the configured grant downlink channel on the configured grant downlink resources.

Optionally, the terminal device determines whether the configured grant downlink resources in the RB set are within the channel occupancy duration according to the indication information in the channel occupancy duration indicator field and/or the SFI-index field included in the DCI format 2_0.

Situation D: the terminal device is not configured to detect a DCI format 2_0, the configured grant downlink resources occupy resources in one RB set.

In this case, in response to that the terminal device determines that configured grant downlink resources in the RB set are within a channel occupancy duration, the terminal device receives the configured grant downlink channel on the configured grant downlink resources. Or, in response to that the terminal device determines that configured grant downlink resources in the RB set is not within the channel occupancy duration, or the terminal device is incapable of determining whether the configured grant downlink resources in the RB set are within the channel occupancy duration, the terminal device does not receive the configured grant downlink channel on the configured grant downlink resources. Or, the terminal device determines not to receive the configured grant downlink channel on the configured grant downlink resources.

Optionally, the configured grant downlink channel in the above solution includes at least one of a Channel State Information Reference Signal (CSI-RS) or a PDSCH. Optionally, the PDSCH includes SPS PDSCH.

Optionally, the configured grant downlink channel includes a Semi-Persistent Scheduling (SPS) Physical Downlink Shared Channel (PDSCH).

In an optional embodiment of the present disclosure, the terminal device may determine whether to receive on the configured grant downlink resource according to the transmission direction corresponding to the configured grant downlink resource. In one example, if the transmission direction corresponding to a symbol on the configured grant downlink resource is a downlink symbol, the terminal device performs reception on the configured grant downlink resource. In another example, if the transmission direction corresponding to the symbol on the configured grant downlink resource is an uplink symbol or a flexible symbol, the terminal device does not perform reception on the configured grant downlink resource.

In an optional embodiment of the present disclosure, the terminal device may determine whether to transmit on the configured grant uplink resource according to the transmission direction corresponding to the configured grant uplink resource. In one example, if the transmission direction corresponding to a symbol on the configured grant uplink resource is an uplink symbol, the terminal device performs transmission on the configured grant uplink resource. In another example, if the transmission direction corresponding to the symbol on the configured grant uplink resource is a downlink symbol or a flexible symbol, the terminal device does not perform transmission on the configured grant uplink resource. It should be noted that the operation that the terminal device performs transmission on the configured grant uplink resource specifically refers to: the terminal device transmits the configured grant uplink channel on the configured grant uplink resource. Optionally, the configured grant uplink channel includes at least one of a Physical Uplink Control Channel (PUCCH), a Physical Uplink Shared Channel (PUSCH), a Physical Random Access Channel (PRACH), and a Sounding Reference Signal (SRS). Optionally, the PUSCH includes at least one of a Configured Grant (CG) PUSCH or an SPS PUSCH.

The embodiment of the present disclosure also provides a method for transmitting a configured grant downlink channel, which will be described in detail below.

Figure 3:
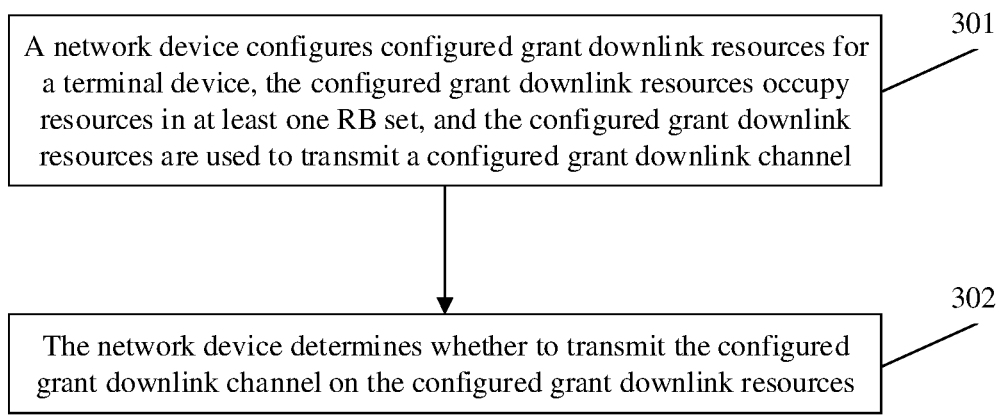
FIG. 3 is a flowchart of a method for transmitting a configured grant downlink channel according to an embodiment of the present disclosure.

FIG. 3 is a flowchart of a method for transmitting a configured grant downlink channel according to an embodiment of the present disclosure. As shown in FIG. 3, the method for transmitting the configured grant downlink channel includes at least part of the following contents.

At 301: a network device configures configured grant downlink resources for a terminal device, where the configured grant downlink resources occupy resources in at least one RB set, and the configured grant downlink resources are used to transmit a configured grant downlink channel.

At 302: the network device determines whether to transmit the configured grant downlink channel on the configured grant downlink resources.

The following describes in detail that the network device determines whether to transmit the configured grant downlink channel on the configured grant downlink resources with reference to different situations.

Situation A: the network device configures the terminal device to detect a DCI format 2_0, the configured grant downlink resources occupy resources in at least two RB sets.

In this case, in response to that the DCI format 2_0 includes indication information for determining that the configured grant downlink resources in the at least two RB sets are available for a downlink reception, the network device transmits the configured grant downlink channel on the configured grant downlink resources. Or, in response to that the DCI format 2_0 does not include indication information for determining that the configured grant downlink resources in the at least two RB sets are available for the downlink reception, the network device does not transmit the configured grant downlink channel on the configured grant downlink resources.

Optionally, the indication information included in the DCI format 2_0 may include at least one of an available RB set indicator, a channel occupancy duration indicator, or an SFI-index.

Situation B: the network device does not configure the terminal device to detect a DCI format 2_0, the configured grant downlink resources occupy resources in at least two RB sets.

In this case, the network device does not transmit the configured grant downlink channel on the configured grant downlink resources.

In another implementation, the network device should not configure the configured grant downlink resources to occupy resources in at least two RB sets without configuring the terminal device to detect the DCI format 2_0.

Situation C: the network device configures the terminal device to detect a DCI format 2_0, the configured grant downlink resources occupy resources in one RB set.

In this case, in response to that the DCI format 2_0 include indication information for determining that the configured grant downlink resources in the RB set are within a channel occupancy duration, the network device transmits the configured grant downlink channel on the configured grant downlink resources. Or, in response to that the DCI format 2_0 does not include indication information for determining that the configured grant downlink resources in the RB set are within the channel occupancy duration, the network device does not transmit the configured grant downlink channel on the configured grant downlink resources.

Optionally, the indication information included in the DCI format 2_0 may include at least one of an available RB set indicator, a channel occupancy duration indicator, or an SFI-index.

Situation D: the network device does not configure the terminal device to detect a DCI format 2_0, the configured grant downlink resources occupy resources in one RB set.

In this case, the network device does not transmit the configured grant downlink channel on the configured grant downlink resources.

In the above solution, optionally, the configured grant downlink channel includes an SPS PDSCH.

Optionally, in all embodiments of the present disclosure, the configuration signaling includes at least one of a Radio Resource Control (RRC) signaling, a Media Access Control Control Element (MAC CE), or Downlink Control Information (DCI).

The technical solutions of the embodiments of the present disclosure may be applied to a NR-U system. The terminal device needs to determine channel occupancy duration information to determine a corresponding channel detection parameter or data transmission behavior. In the case that the channel occupancy duration indicator field is configured in the DCI format 2_0, the terminal device determines the duration of the channel occupancy time according to the channel occupancy duration indicator field. For example, the remaining channel occupancy duration of the cell includes the remaining channel occupancy duration of the cell starting from the time domain location at which the DCI format 2_0 is detected by the terminal device. In the case that no channel occupancy duration indicator field is configured in the DCI format 2_0, the terminal device determines the duration of the channel occupancy time according to the SFI-index indicator field. For example, the remaining channel occupancy duration of the cell includes the number of slots or symbols determined according to the slot format indicated by the SFI-index field starting from the time domain location at which the DCI format 2_0 is detected by the terminal device.

In the technical solutions of the embodiments of the present disclosure, in order to determine the duration of the channel occupancy time, the behavior of the terminal device includes at least one of the following.

1. The terminal device does not expect to be configured to detect the DCI format 2_0, where the SFI-index field is not included in the DCI format 2_0. Alternatively, in the case that the terminal device is configured to detect the DCI format 2_0, the SFI-index field in the DCI format 2_0 is mandatory.

2. The terminal device does not expect to be configured to detect the DCI format 2_0, where the DCI format 2_0 includes neither the SFI-index field nor the channel occupancy duration indicator field. Alternatively, if the terminal device is configured to detect the DCI format 2_0, the DCI format 2_0 includes at least one of the SFI-index field and the channel occupancy duration indicator field. For example, if the terminal device is configured to detect the DCI format 2_0, then the SFI-index field is configured in the DCI format 2_0, or the channel occupancy duration indicator field is configured in the DCI format 2_0, or the SFI-index field and the channel occupancy duration indicator field are configured in the DCI format 2_0.

3. If the terminal device is configured to detect the SFI-index format 2_0, where the SFI-index format 2_0 includes neither the SFI-index field nor the channel occupancy duration indicator field, then the terminal device determines the duration of the channel occupancy time according to a preset value, wherein the preset value may be preset (such as being preset by a standard) or may be configured by a network device.

In the technical solutions of the embodiments of the present disclosure, for the reception of the configured grant downlink channel on the configured grant downlink resources (e.g., the reception of the SPS PDSCH), the behavior of the terminal device includes at least one of the following.

1. The terminal device does not expect that the configured grant downlink resources are configured in two or more RB sets. Alternatively, the terminal device expects that the configured grant downlink resources are configured in one RB set.

2. If the configured grant downlink resources of the terminal device are configured in at least two RB sets and the terminal device is configured to detect the DCI format 2_0, the terminal device can perform reception of the configured grant downlink channel only when the DCI format 2_0 is received and the DCI format 2_0 indicates (e.g., through the available RB set indicator field) that the at least two RB sets are available for downlink reception. Alternatively, if the configured grant downlink resources of the terminal device are configured in at least two RB sets, and the terminal device is configured to detect the DCI format 2_0, the terminal device does not perform reception of the configured grant downlink channel if the terminal device does not receive the DCI format 2_0 or the terminal device receives the DCI format 2_0 but the DCI format 2_0 indicates (e.g., through the available RB set indicator field) that at least one of the at least two RB sets cannot be used for downlink reception.

3. If the configured grant downlink resources of the terminal device are configured in one RB set, and the terminal device is configured to detect the DCI format 2_0, the terminal device can perform reception of the configured grant downlink channel only when the DCI format 2_0 is received and the DCI format 2_0 indicates (e.g., through the SFI indicator or the channel occupancy duration indicator) that the configured grant downlink resources in the RB set are within the channel occupancy duration of the network device. Alternatively, if the configured grant downlink resources of the terminal device are configured in one RB set and the terminal device is configured to detect the DCI format 2_0, the terminal device does not perform reception of the configured grant downlink channel if the terminal device does not receive the DCI format 2_0 or the terminal device receives the DCI format 2_0 but the DCI format 2_0 does not indicate (e.g., through the SFI indicator or the channel occupancy duration indicator) that the configured grant downlink resources in the RB set are within the channel occupancy duration of the network device.

4. If the configured grant downlink resources of the terminal device are configured in one RB set, the terminal device can perform reception of the configured grant downlink channel only when determining that the configured grant downlink resources in the RB set are within a channel occupancy duration of the network device. Alternatively, if the configured grant downlink resources of the terminal device are configured in one RB set, but the terminal device cannot determine that the configured grant downlink resources in the RB set are within the channel occupancy duration of the network device, the terminal device does not perform reception of the configured grant downlink channel.

The technical solutions of the embodiments of the present disclosure also clarify the data transmission behavior of the terminal device in the following situations.

First Situation: the terminal device is not configured to detect the DCI format 2_0.

In this case, the behavior of the terminal device determining the channel occupancy duration information includes at least one of the following:

The terminal device cannot obtain the channel occupancy duration information, or the terminal device determines that the channel occupancy duration is 0;

The terminal device determines that the channel occupancy duration is a preset value. Further, optionally, the channel occupancy duration may be preset by a standard or configured by a network device. Alternatively, the channel occupancy duration may be determined according to a channel access priority indicator (CAPC). Alternatively, the channel occupancy duration may be preset to a minimum value or a maximum value. For example, the minimum value is 2 ms and maximum value is 10 ms.

Second Situation: the terminal device is configured to detect the DCI format 2_0, but the DCI format 2_0 does not include the SFI-index field and does not include the channel occupancy duration indicator field.

In this case, the behavior of the terminal device determining the channel occupancy duration information includes at least one of the following:

The terminal device cannot obtain the channel occupancy duration information, or the terminal device determines that the channel occupancy duration is 0.

The terminal device determines that the channel occupancy duration is a preset value. Further, optionally, the channel occupancy duration may be preset by a standard or configured by a network device. Alternatively, the channel occupancy duration may be determined according to the channel access priority indicator. Alternatively, the channel occupancy duration may be preset to a minimum value or a maximum value. For example, the minimum value is 2 ms and the maximum value is 10 ms. Alternatively, the channel occupancy duration may be determined according to a timer configured by the network device. For example, if the terminal device is configured with a search space set group switching indicator field, the channel occupancy duration may be determined according to the duration of the timer configured in this case.

In an optional manner, in this case, when the terminal device cannot obtain the channel occupancy duration information, or the terminal device determines that the channel occupancy duration is 0, if the terminal device is configured with a search space set group switching indicator field and two Search Space Set (SSS) groups, the behavior of the terminal device to detect the PDCCH includes at least one of the following:

If the terminal device does not receive the DCI format 2_0, the terminal device performs PDCCH detection in a first SSS group (e.g., SSS group 0).

If the terminal device receives the search space set group switching indicator field and the indicator field indicates "0", the terminal device performs PDCCH detection in the first SSS group (e.g., SSS group 0). Here, specifically, if the terminal device previously performed PDCCH detection in group 0, the terminal device continues to perform PDCCH detection in group 0. If the terminal device previously performed PDCCH detection in group 1, the terminal device switches to perform PDCCH detection in group 0.

If the terminal device receives the search space set group switching indicator field and the indicator field indicates "1", the terminal device performs PDCCH detection in a second SSS group (e.g., SSS group 1). Optionally, the terminal device starts a timer. Here, specifically, if the terminal device previously performed PDCCH detection in group 1, the terminal device continues to perform PDCCH detection in group 1. If the terminal device previously performed PDCCH detection in group 0, the terminal device switches to perform PDCCH detection in group 1. Further, after the timer expires, the terminal device switches from performing PDCCH detection in group 1 to performing PDCCH detection in group 0. It should be understood that in this case, the terminal device does not determine the detection behavior for the PDCCH according to the channel occupancy duration information or the end location information of the channel occupancy. For example, switching from performing the PDCCH detection according to the group 1 to performing the PDCCH detection according to the group 0.

Third Situation: the terminal device is configured to detect the DCI format 2_0, the DCI format 2_0 does not include the SFI-index field but includes the channel occupancy duration indicator field.

In this case, the communication behavior of the terminal device includes at least one of the following:

The terminal device determines the channel occupancy duration information according to the channel occupancy duration indicator field.

If an available RB set indicator field is configured in the DCI format 2_0, the information indicating whether the RB set indicated by the available RB set indicator field is available for downlink reception is valid within the determined channel occupancy duration.

In the embodiments of the present disclosure, optionally, if the terminal device cannot obtain the channel occupancy duration information, or the terminal device determines that the channel occupancy duration is 0, for the available RB set indicator field, the behavior of the terminal device includes at least one of the following:

1) The terminal device does not expect that the available RB set indicator field is configured in the DCI format 2_0 in this case.

2) If the available RB set indicator field is configured in the DCI format 2_0, the available RB set indicator field is not used to indicate information on whether the RB set is available for downlink reception.

Fourth Situation: the terminal device is configured to detect the DCI format 2_0, but the DCI format 2_0 does not include the SFI-index field.

In this case, the communication behavior of the terminal device includes at least one of the following.

For the configured grant downlink channel, the terminal device may determine whether to perform reception of the configured grant downlink channel according to the behavior of the terminal device in the case of not being configured to detect the DCI format 2_0 in R15.

For the configured grant uplink transmission, the terminal device may determine whether to perform transmission of the configured grant uplink transmission according to the behavior of the terminal device in the case of not being configured to detect the DCI format 2_0 in R15.

In the embodiments of the present disclosure, optionally, if the terminal device cannot obtain the channel occupancy duration information, or the terminal device determines that the channel occupancy duration is 0, or the DCI format 2_0 does not include the SFI-index field, for the configured grant downlink channel, the behavior of the terminal device includes at least one of the following:

1) If the configured grant downlink channel resources occupy resources in at least two RB sets in the frequency domain, the terminal device does not perform reception of the configured grant downlink channel or the terminal device does not perform reception on the configured grant downlink channel resources;

2) The terminal device does not expect that the configured grant downlink channel resources occupy resources in two or more RB sets in the frequency domain;

3) The terminal device expects that the configured grant downlink channel resources occupy resources in one RB set in the frequency domain;

4) The terminal device does not perform reception of the configured grant downlink channel or the terminal device does not perform reception on the configured grant downlink channel resources.

In the embodiments of the present disclosure, optionally, if the terminal device cannot obtain the channel occupancy duration information, or the terminal device determines that the channel occupancy duration is 0, or the DCI format 2_0 does not include the SFI-index field. For the configured grant uplink transmission, the behavior of the terminal device includes at least one of the following:

1) The terminal device may perform transmitting of the configured grant uplink transmission on the configured grant uplink transmission resources;

2) In the case that the terminal device is configured with the configured grant uplink authorization enable, the terminal device may perform transmitting of the configured grant uplink transmission on the configured grant uplink transmission resources.

3) In the case that the terminal device is not configured with the configured grant uplink authorization enable, the terminal device cannot perform transmitting of the configured grant uplink transmission on the configured grant uplink transmission resources or the terminal device does not perform transmitting on the configured grant uplink transmission resources.

Alternatively, the configured grant uplink authorization enable is an enable parameter configured by the network device.

In the above solutions, optionally, the configured grant downlink channel includes at least one of a CSI-RS or a PDSCH. Further, the PDSCH includes SPS PDSCH. The configured grant uplink transmission includes at least one of a PUCCH, a PUSCH, a PRACH, or an SRS.

In the embodiment of the present disclosure, optionally, if the terminal device cannot obtain the channel occupancy duration information, or the terminal device determines that the channel occupancy duration is 0, the behavior of the terminal device includes at least one of the following:

1) For the uplink transmission of the terminal device, the terminal device may be instructed by the network device to use the channel access mode of Type 2A, Type 2B or Type 2C;

2) If the terminal device does not receive the indication information indicating that the channel access mode of Type 2A, Type 2B or Type 2C is used, the terminal device cannot use the channel access mode of Type 2A, Type 2B or Type 2C. For example, switching of the terminal device from the channel access mode of Type 1 to the channel access mode of Type 2A is not supported.

Figure 4:
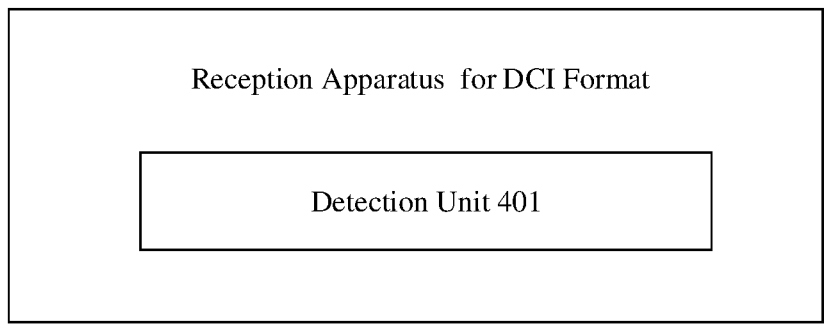
FIG. 4 is a schematic structural diagram of a reception apparatus for a DCI format according to an embodiment of the present disclosure.

FIG. 4 is a schematic structural diagram of a reception apparatus for a DCI format according to an embodiment of the present disclosure, which is applied to a terminal device. As shown in FIG. 4, the reception apparatus for the DCI format includes a detection unit 401.

In an optional embodiment of the present disclosure, the terminal device is configured to detect the DCI format 2_0.

The terminal device does not expect that the DCI format 2_0 is not configured with a slot format indicator field; Or In response to that the terminal device determines that the DCI format 2_0 is not configured with the slot format indicator field, the detection unit 401 is configured to not detect the DCI format 2_0; Or In response to that the terminal device determines that the DCI format 2_0 is configured with the slot format indicator field, the detection unit 401 is configured to detect the DCI format 2_0.

In an optional embodiment of the present disclosure, the terminal device is configured to detect the DCI format 2_0;

The terminal device is configured to detect the DCI format 2_0;

The terminal device does not expect that the DCI format 2_0 is not configured with a slot format indicator field and a channel occupancy duration indicator field; Or In response to that the terminal device determines that the DCI format 2_0 is not configured with the slot format indicator field and the channel occupancy duration indicator field, the detection unit 401 is configured to not detect the DCI format 2_0; Or In response to that the terminal device determines that the DCI format 2_0 is configured with at least one of the slot format indicator field or the channel occupancy duration indicator field, the detection unit 401 is configured to detect the DCI format 2_0.

In an optional embodiment of the present disclosure, the terminal device is configured to detect the DCI format 2_0, and the DCI format 2_0 is not configured with a slot format indicator field and a channel occupancy duration indicator field. The detection unit 401 is configured to detect the DCI format 2_0.

Further, optionally, the apparatus further includes a determining unit (not shown).

The determining unit is configured to determine a channel occupancy duration in a manner including at least one of:
  determining that the channel occupancy duration cannot be obtained;
  the channel occupancy duration is 0;
  the channel occupancy duration is a preset value; or
  the channel occupancy duration is configured by a network device.

It should be understood by those skilled in the art that the related description of the above-described apparatus of the embodiments of the present disclosure may be understood with reference to the related description of any of the methods described in the embodiments of the present disclosure.

Figure 5:
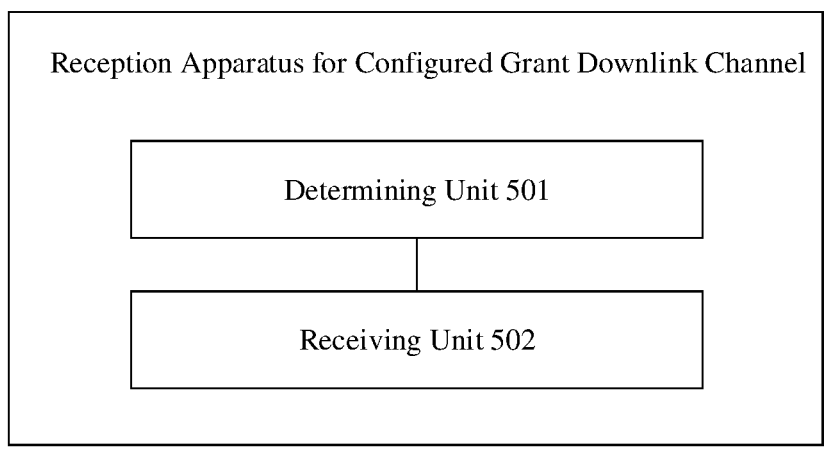
FIG. 5 is a schematic structural diagram of a reception apparatus for a configured grant downlink channel according to an embodiment of the present disclosure.

FIG. 5 is a schematic structural diagram of a reception apparatus for a configured grant downlink channel according to an embodiment of the present disclosure. The apparatus is applied to a terminal device. The terminal device is configured with configured grant downlink resources, the configured grant downlink resources occupy resources in at least one RB set, the configured grant downlink resources are used to transmit the configured grant downlink channel. The apparatus includes a determining unit 501.

The determining unit 501 is configured to determine whether to receive the configured grant downlink channel on the configured grant downlink resources.

Further, optionally, the terminal device is configured to detect the DCI format 2_0, the configured grant downlink resources occupy resources in at least two RB sets, and the apparatus further includes a receiving unit 502.

In response to that the determining unit 501 determines, according to the detected DCI format 2_0, that the configured grant downlink resources in the at least two RB sets are available for a downlink reception, the receiving unit 502 is configured to receive, on the configured grant downlink resources, the configured grant downlink channel; Or In response to that the determining unit 501 determines, according to the detected DCI format 2_0, that the configured grant downlink resources in at least one of the at least two RB sets are unavailable for the downlink reception, or the determining unit 501 determines that no DCI format 2_0 is detected, the receiving unit 502 is configured to not receive, on the configured grant downlink resources, the configured grant downlink channel.

Further, optionally, the terminal device is not configured to detect the DCI format 2_0, the configured grant downlink resources occupy resources in at least two RB sets.

The determining unit 501 is configured to determine not to receive the configured grant downlink channel on the configured grant downlink resources; Or The terminal device does not expect to be configured with the configured grant downlink resources occupying the resources in at least two RB sets, and is not configured to detect the DCI format 2_0.

Further, optionally, the terminal device is configured to detect the DCI format 2_0, the configured grant downlink resources occupy resources in one RB set, and the apparatus further includes a receiving unit 502, In response to that the determining unit 501 determines, according to the detected DCI format 2_0, that configured grant downlink resources in the RB set are within a channel occupancy duration, the receiving unit 502 is configured to receive, on the configured grant downlink resources, the configured grant downlink channel; Or In response to that the determining unit 501 determines, according to the detected DCI format 2_0, that configured grant downlink resources in the RB set are not within a channel occupancy duration, or the determining unit 501 determines that no DCI format 2_0 is detected, the receiving unit 502 is configured to not receive, on the configured grant downlink resources, the configured grant downlink channel.

Further, optionally, the terminal device is not configured to detect a DCI format 2_0, and the configured grant downlink resources occupy resources in one RB set, In response to that the determining unit 501 determines that configured grant downlink resources in the RB set are within a channel occupancy duration, the receiving unit 502 is configured to receive, on the configured grant downlink resources, the configured grant downlink channel; Or In response to that the determining unit 501 determines that configured grant downlink resources in the RB set is not within a channel occupancy duration, or the determining unit 501 is incapable of determining whether the configured grant downlink resources in the RB set are within the channel occupancy duration, the receiving unit 502 is configured to not receive, on the configured grant downlink resources, the configured grant downlink channel; Or The determining unit 501 is configured to determine not to receive, on the configured grant downlink resources, the configured grant downlink channel.

Further, optionally, the configured grant downlink channel includes an SPS PDSCH.

It should be understood by those skilled in the art that the related description of the above-described apparatus of the embodiments of the present disclosure may be understood with reference to the related description of any of the methods described in the embodiments of the present disclosure.

Figure 6:
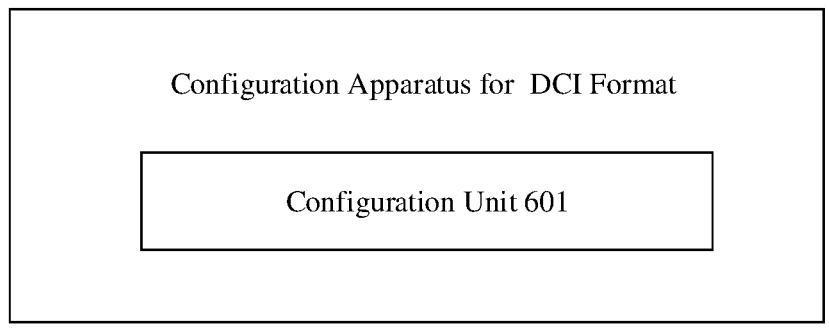
FIG. 6 is a schematic structural diagram of a configuration apparatus for a DCI format according to an embodiment of the present disclosure.

FIG. 6 is a schematic structural diagram of a configuration apparatus for a DCI format according to an embodiment of the present disclosure. The apparatus is applied to a network device. As shown in FIG. 6, the configuration apparatus for the DCI format includes a configuration unit 601.

In an optional embodiment of the present disclosure, the configuration unit 601 is configured to configure a terminal device to detect a DCI format 2_0, and configure a slot format indicator field in the DCI format 2_0 for the terminal device.

In an optional embodiment of the present disclosure, the configuration unit 601 is configured to configure a terminal device to detect a DCI format 2_0, and configure at least one of the slot format indicator field or a channel occupancy duration indicator field in the DCI format 2_0 for the terminal device.

In an optional embodiment of the present disclosure, the configuration unit 601 is configured to configure a terminal device to detect a DCI format 2_0, and configure no slot format indicator field and no channel occupancy duration indicator field in the DCI format 2_0 for the terminal device.

Further, optionally, the configuration unit 601 is further configured to configure a first parameter for the terminal device, and the first parameter is used for the terminal device to determine a channel occupancy duration after detecting the DCI format 2_0.

It should be understood by those skilled in the art that the related description of the above-described apparatus of the embodiments of the present disclosure may be understood with reference to the related description of any of the methods described in the embodiments of the present disclosure.

Figure 7:
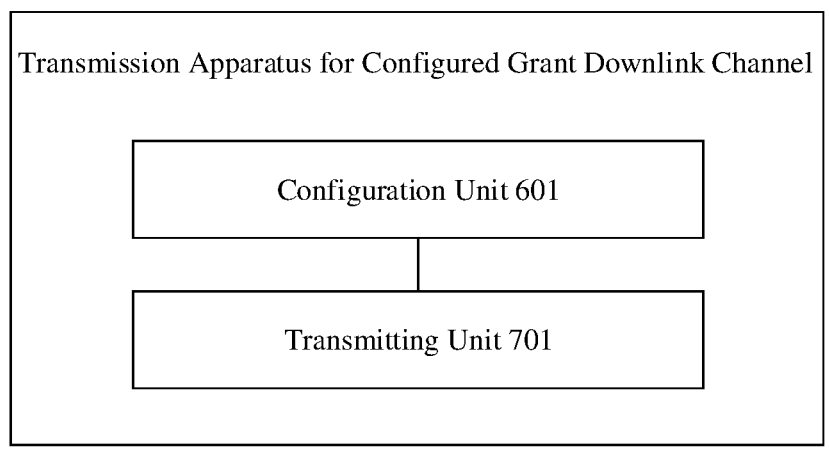
FIG. 7 is a schematic structural diagram of a transmission apparatus for a configured grant downlink channel according to an embodiment of the present disclosure.

FIG. 7 is a schematic structural diagram of a transmission apparatus for a configured grant downlink channel according to an embodiment of the present disclosure. The apparatus is applied to a network device. As shown in FIG. 7, the transmission apparatus for the configured grant downlink channel includes a configuration unit 601 and a transmitting unit 701:

The configuration unit 601 is configured to configure configured grant downlink resources for a terminal device, where the configured grant downlink resources occupy resources in at least one RB set, and the configured grant downlink resources are used to transmit a configured grant downlink channel.

The transmitting unit 701 is configured to determine whether to transmit the configured grant downlink channel on the configured grant downlink resources.

Further, optionally, the configuration unit 601 configures the terminal device to detect a DCI format 2_0, and the configured grant downlink resources occupy resources in at least two RB sets.

In response to that the DCI format 2_0 includes indication information for determining that the configured grant downlink resources in the at least two RB sets are available for a downlink reception, the transmitting unit 701 is configured to transmit the configured grant downlink channel on the configured grant downlink resources; Or In response to that the DCI format 2_0 does not include indication information for determining that the configured grant downlink resources in the at least two RB sets are available for the downlink reception, the transmitting unit 701 is configured to not transmit the configured grant downlink channel on the configured grant downlink resources.

Further, optionally, the configuration unit 601 does not configure the terminal device to detect a DCI format 2_0, and the configured grant downlink resources occupy resources in at least two RB sets, The transmitting unit 701 is configured to not transmit the configured grant downlink channel on the configured grant downlink resources.

Further, optionally, the configuration unit 601 configures the terminal device to detect a DCI format 2_0, and the configured grant downlink resources occupy resources in one RB set.

In response to that the DCI format 2_0 include indication information for determining that the configured grant downlink resources in the RB set are within a channel occupancy duration, the transmitting unit 701 is configured to transmit the configured grant downlink channel on the configured grant downlink resource. Or in response to that the DCI format 2_0 does not include indication information for determining that the configured grant downlink resources in the RB set are within the channel occupancy duration, the transmitting unit 701 is configured to not transmit the configured grant downlink channel on the configured grant downlink resources.

Further, optionally, the network device does not configure the terminal device to detect a DCI format 2_0, and the configured grant downlink resources occupy resources in one RB set.

The transmitting unit 701 is configured to not transmit the configured grant downlink channel on the configured grant downlink resources.

Further, optionally, the configured grant downlink channel includes an SPS PDSCH.

It should be understood by those skilled in the art that the related description of the above-described apparatus of the embodiments of the present disclosure may be understood with reference to the related description of any of the methods described in the embodiments of the present disclosure.

Figure 8:
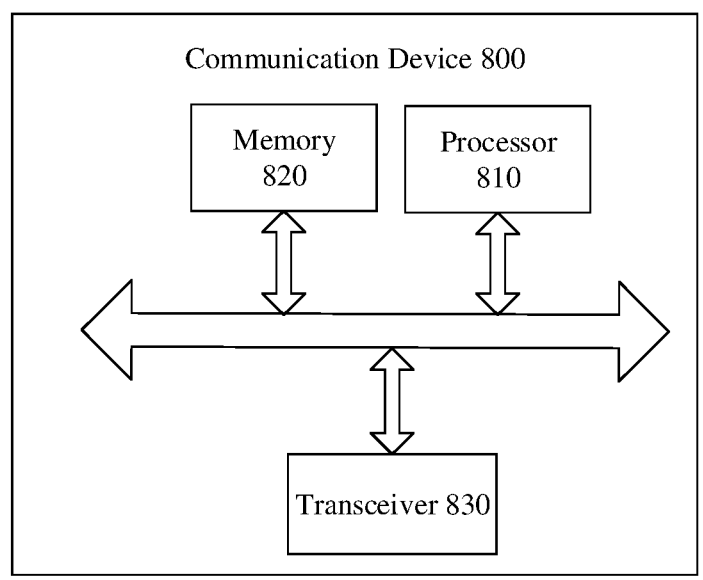
FIG. 8 is a schematic structural diagram of a communication device according to an embodiment of the present disclosure.

FIG. 8 is a schematic structural diagram of a communication device 800 according to an embodiment of the present disclosure. The communication device may be a terminal device or a network device. The communication device 800 shown in FIG. 8 includes a processor 810 that may invoke and execute a computer program from a memory to implement the method of the embodiments of the present disclosure.

Alternatively, as shown in FIG. 8, the communication device 800 may further include a memory 820. The processor 810 may invoke and execute a computer program from the memory 820 to implement the method of the embodiments of the present disclosure.

The memory 820 may be a separate device independent of the processor 810, or may be integrated into the processor 810.

Alternatively, as shown in FIG. 8, the communication device 800 may further include a transceiver 830 that may be controlled by the processor 810 to communicate with other devices, in particular sending information or data to other devices, or receiving information or data sent by other devices.

The transceiver 830 may include a transmitter and a receiver. The transceiver 830 may further include antennas. The number of antennas may be one or more.

Alternatively, the communication device 800 may be the network device of the embodiments of the disclosure, and the communication device 800 may implement the corresponding operations implemented by the network device in each method of the embodiments of the disclosure. For brevity, details are not described herein.

Alternatively, the communication device 800 may be the mobile terminal/terminal device of the embodiments of the disclosure, and the communication device 800 may implement the corresponding operations implemented by the mobile terminal/terminal device in each method of the embodiments of the disclosure. For brevity, details are not described herein.

Figure 9:
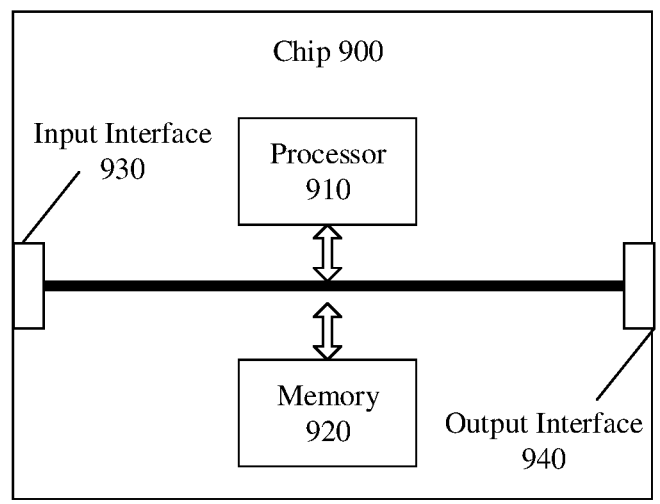
FIG. 9 is a schematic structural diagram of a chip according to an embodiment of the present disclosure.

FIG. 9 is a schematic structural diagram of a chip according to an embodiment of the present disclosure. The chip 900 shown in FIG. 9 includes a processor 910 that may invoke and execute a computer program from a memory to implement the method of the embodiments of the present disclosure.

Alternatively, as shown in FIG. 9, the chip 900 may further include a memory 920. The processor 910 may invoke and execute a computer program from the memory 920 to implement the method of the embodiments of the present disclosure.

The memory 920 may be a separate device independent of the processor 910, or may be integrated into the processor 910.

Alternatively, the chip 900 may further include an input interface 930. The processor 910 may control the input interface 930 to communicate with other devices or chips, and specifically, may obtain information or data transmitted by the other devices or chips.

Alternatively, the chip 900 may further include an output interface 940. The processor 910 may control the output interface 940 to communicate with other devices or chips, and specifically, may output information or data to other devices or chips.

Alternatively, the chip may be applied to the network device in the embodiments of the present disclosure, and the chip may implement the corresponding operations implemented by the network device in each method of the embodiments of the present disclosure. For brevity, details are not described herein.

Alternatively, the chip may be applied to the mobile terminal/terminal device in the embodiments of the present disclosure, and the chip may implement the corresponding operations implemented by the mobile terminal/terminal device in each method of the embodiments of the present disclosure. For brevity, details are not described herein.

It should be understood that the chip mentioned in the embodiments of the present disclosure may also be referred to as a system-level chip, a system chip, a chip system, or a system-on-chip.

Figure 10:
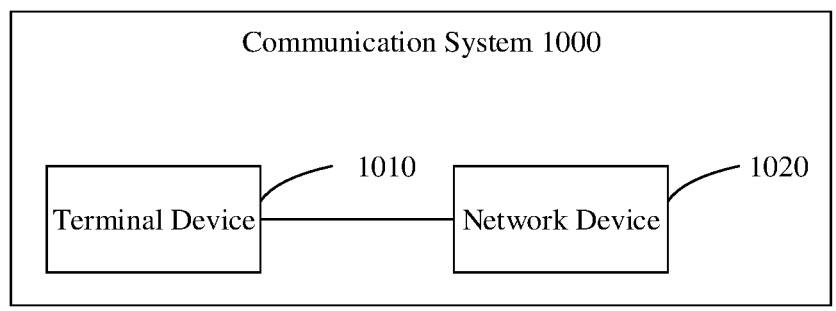
FIG. 10 is a schematic block diagram of a communication system according to an embodiment of the present disclosure.

FIG. 10 is a schematic block diagram of a communication system 1000 according to an embodiment of the present disclosure. As shown in FIG. 10, the communication system 1000 includes a terminal device 1010 and a network device 1020.

The terminal device 1010 may be configured to implement a corresponding function implemented by the terminal device in the method described above, and the network device 1020 may be configured to implement a corresponding function implemented by the network device in the method described above. For brevity, details are not described herein.

It is to be understood that the processor in the embodiment of the disclosure may be an integrated circuit chip and has a signal processing capability. In an implementation process, each operation of the method embodiment may be completed by an integrated logical circuit of hardware in the processor or an instruction in a software form. The processor described above may be a universal processor, a Digital Signal Processor (DSP), an Application Specific Integrated Circuit (ASIC), a Field Programmable Gate Array (FPGA) or another programmable logical device, a discrete gate or a transistor logical device and a discrete hardware component. Each method, step and logical block diagram disclosed in the embodiments of the disclosure may be implemented or executed. The universal processor may be a microprocessor or the processor may also be any conventional processor and the like. The operations of the method disclosed in combination with the embodiments of the disclosure may be directly embodied to be executed and completed by a hardware decoding processor or executed and completed by a combination of hardware and software modules in the decoding processor. The software module may be located in a mature storage medium in this field such as a Random Access Memory (RAM), a flash memory, a Read-Only Memory (ROM), a Programmable ROM (PROM) or Electrically Erasable PROM (EEPROM) and a register. The storage medium is located in a memory, and the processor reads information in the memory, and completes the operations of the methods in combination with hardware.

It can be understood that the memory in the embodiment of the disclosure may be a volatile memory or a nonvolatile memory, or may include both the volatile and nonvolatile memories. The nonvolatile memory may be a ROM, a programmable ROM (PROM), an Erasable PROM (EPROM), an Electrically EPROM (EEPROM) or a flash memory. The volatile memory may be a random access memory (RAM), and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM) and a Direct Rambus RAM (DR RAM). It is to be noted that the memory of a system and method described in the disclosure is intended to include, but not limited to, memories of these and any other proper types.

It is to be understood that the memory is exemplarily but unlimitedly described. For example, the memory in the embodiments of the disclosure may also be an SRAM, a DRAM, an SDRAM, a DDR SDRAM, an ESDRAM, an SLDRAM and a DR RAM. That is, the memory in the embodiments of the disclosure is intended to include, but not limited to, memories of these and any other proper types.

An embodiment of the disclosure further provides a computer-readable storage medium, which is configured to store a computer program.

Alternatively, the computer-readable storage medium may be applied to a network device in the embodiments of the disclosure, and the computer program enables a computer to execute corresponding operations implemented by the network device in each method of the embodiments of the disclosure. For simplicity, elaborations are omitted herein.

Alternatively, the computer-readable storage medium may be applied to a mobile terminal/terminal device in the embodiments of the disclosure, and the computer program enables a computer to execute corresponding operations implemented by the mobile terminal/terminal device in each method of the embodiments of the disclosure. For simplicity, elaborations are omitted herein.

An embodiment of the disclosure further provides a computer program product, which includes a computer program instruction.

Alternatively, the computer program product may be applied to a network device in the embodiments of the disclosure, and the computer program instruction enables a computer to execute corresponding operations implemented by the network device in each method of the embodiments of the disclosure. For simplicity, elaborations are omitted herein.

Alternatively, the computer program product may be applied to a mobile terminal/terminal device in the embodiments of the disclosure, and the computer program instruction enables the computer to execute corresponding operations implemented by the mobile terminal/terminal device in each method of the embodiments of the disclosure. For simplicity, elaborations are omitted herein.

An embodiment of the disclosure further provides a computer program.

Alternatively, the computer program may be applied to a network device in the embodiments of the disclosure, and the computer program runs in a computer to enable the computer to execute corresponding operations implemented by the network device in each method of the embodiments of the disclosure. For simplicity, elaborations are omitted herein.

Alternatively, the computer program may be applied to a mobile terminal/terminal device in the embodiments of the disclosure, and the computer program runs in the computer to enable the computer to execute corresponding flows implemented by the mobile terminal/terminal device in each method of the embodiments of the disclosure. For simplicity, elaborations are omitted herein.

With the above-described technical solution, it is possible to effectively specify the data transmission behavior of the terminal device in the case that a part of the indicator fields in the DCI format 2_0 are not configured.

Those of ordinary skill in the art may realize that the units and algorithm steps of each example described in combination with the embodiments disclosed in the disclosure may be implemented by electronic hardware or a combination of computer software and the electronic hardware. Whether these functions are executed in a hardware or software manner depends on specific disclosures and design constraints of the technical solutions. Professionals may realize the described functions for each specific disclosure by use of different methods, but such realization shall fall within the scope of the disclosure.

Those skilled in the art may clearly learn about that regarding specific operating processes of the system, device and unit described above, reference may be made to the corresponding processes in the method embodiment. The operating processes are not be elaborated herein for convenient and brief description.

In some embodiments provided by the disclosure, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be omitted or not executed. In addition, coupling or direct coupling or communication connection between displayed or discussed components may be indirect coupling or communication connection implemented through some interfaces, the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, all functional units in each embodiment of the disclosure may be integrated into a processing unit, or each functional unit may also physically exist independently, and two or more than two functional units may also be integrated into a unit.

When being realized in form of software functional unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the operations of the method in each embodiment of the disclosure. The abovementioned storage medium includes: various media capable of storing program codes such as a U disk, a mobile hard disk, a ROM, a RAM, a magnetic disk or an optical disk.

The forgoing is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A method for receiving a Downlink Control Information (DCI) format, comprising:
   in response to that a terminal device is configured to detect a DCI format 2_0 and the DCI format 2_0 is not configured with a slot format indicator field and a channel occupancy duration indicator field, detecting, by the terminal device, the DCI format 2_0; and
   determining, by the terminal device after detecting the DCI format 2_0, a channel occupancy duration, the channel occupancy duration being a preset value configured by a network device.

2. A method for configuring a Downlink Control Information (DCI) format, comprising:
   configuring, by a network device, a terminal device to detect a DCI format 2_0;
   configuring, by the network device, no slot format indicator field and no channel occupancy duration indicator field in the DCI format 2_0 for the terminal device; and configuring, by the network device, a first parameter for the terminal device, wherein the first parameter is used for the terminal device to determine a channel occupancy duration after detecting the DCI format 2_0.

3. A terminal device, comprising: a processor and a memory, wherein the memory is configured to store a computer program, and the processor is configured to execute the computer program stored in the memory to perform a method for receiving a Downlink Control Information (DCI) format, comprising:

in response to that the terminal device is configured to detect a DCI format 2_0 and the DCI format 2_0 is not configured with a slot format indicator field and a channel occupancy duration indicator field, detecting the DCI format 2_0; and determining a channel occupancy duration after the terminal device detects the DCI format 2_0, the channel occupancy duration being a preset value configured by a network device.

* * * * *